United States Patent
Stibel et al.

(10) Patent No.: US 8,996,391 B2
(45) Date of Patent: Mar. 31, 2015

(54) CUSTOM SCORE GENERATION SYSTEM AND METHODS

(71) Applicant: Credibility Corp., Malibu, CA (US)

(72) Inventors: Jeffrey M. Stibel, Malibu, CA (US);
Aaron B. Stibel, Malibu, CA (US);
Judith G. Hackett, Malibu, CA (US);
Moujan Kazerani, Santa Monica, CA (US)

(73) Assignee: Credibility Corp., Malibu, CA (US)

( * ) Notice: Subject to any disclaimer, the term of this patent is extended or adjusted under 35 U.S.C. 154(b) by 0 days.

(21) Appl. No.: 13/874,170

(22) Filed: Apr. 30, 2013

(65) Prior Publication Data

US 2014/0280217 A1   Sep. 18, 2014

Related U.S. Application Data

(60) Provisional application No. 61/785,238, filed on Mar. 14, 2013.

(51) Int. Cl.
| | |
|---|---|
| G06Q 10/10 | (2012.01) |
| G06Q 30/02 | (2012.01) |
| G06Q 10/06 | (2012.01) |
| G06Q 30/06 | (2012.01) |
| G06F 17/30 | (2006.01) |
| G06Q 40/02 | (2012.01) |

(52) U.S. Cl.
CPC ...... *G06F 17/30386* (2013.01); *G06Q 30/0282* (2013.01); *G06Q 10/06393* (2013.01); *G06Q 10/0635* (2013.01); *G06Q 10/0637* (2013.01); *G06Q 40/025* (2013.01); *G06F 17/30283* (2013.01)

USPC .......................................... 705/1.1; 705/347

(58) Field of Classification Search
CPC ................................................. G06Q 30/0282
USPC ...................................................... 705/1.1–912
See application file for complete search history.

(56) References Cited

U.S. PATENT DOCUMENTS

| | | |
|---|---|---|
| 5,659,732 A | 8/1997 | Kirsch |
| 6,950,809 B2 | 9/2005 | Dahan et al. |
| 6,961,562 B2 | 11/2005 | Ross |
| 6,996,569 B1 | 2/2006 | Bedell et al. |
| 7,369,999 B2 | 5/2008 | DuBois et al. |
| 7,392,240 B2 | 6/2008 | Scriffignano et al. |
| 7,584,188 B2 | 9/2009 | Scriffignano et al. |
| 7,708,196 B2 | 5/2010 | Palmieri et al. |

(Continued)

*Primary Examiner* — Jonathan Ouellette (74) *Attorney, Agent, or Firm* — Los Angeles Patent Group; Arman Katiraei (57) ABSTRACT

Some embodiments provide a custom score generation system by offering third parties access to data from a shared database that they can merge with their own proprietary data for the purpose of defining and producing new data services. The system provides interfaces for selecting data elements from the shared database, attributing weights to the selected data elements, and defining scoring rules or parameters to automatically evaluate the significance of the data element values. Additionally, conditions may be specified to include different sets of the selected data elements, to attribute different weights to the different sets of the selected data elements, and to define different scoring rules according to which conditions are satisfied. The system then automatically formulates the algorithm to produce the custom score in conformance with the provided inputs and based on values for the selected data elements that are specific to different entities.

16 Claims, 8 Drawing Sheets

(56) References Cited

U.S. PATENT DOCUMENTS

| | | |
|---|---|---|
| 7,711,697 B2 | 5/2010 | Parry et al. |
| 7,716,141 B2 | 5/2010 | Stewart et al. |
| 7,822,757 B2 | 10/2010 | Stoker et al. |
| 7,962,461 B2 | 6/2011 | Ruhl et al. |
| 8,170,958 B1 | 5/2012 | Gremett et al. |
| 8,364,650 B2 * | 1/2013 | Janin et al. ................... 707/690 |
| 2002/0167919 A1 | 11/2002 | Marples et al. |
| 2003/0061232 A1 | 3/2003 | Patterson |
| 2003/0115133 A1 | 6/2003 | Bian |
| 2003/0117443 A1 | 6/2003 | Langner et al. |
| 2003/0120614 A1 | 6/2003 | Shumpert |
| 2004/0133501 A1 | 7/2004 | Parry et al. |
| 2004/0162742 A1 | 8/2004 | Stoker et al. |
| 2005/0010513 A1 | 1/2005 | Duckworth et al. |
| 2005/0015320 A1 | 1/2005 | Hayenhjelm et al. |
| 2005/0119961 A1 | 6/2005 | Tanzillo et al. |
| 2005/0130704 A1 | 6/2005 | McParland et al. |
| 2005/0131760 A1 | 6/2005 | Manning et al. |
| 2005/0192891 A1 | 9/2005 | Ferrera et al. |
| 2005/0240503 A1 | 10/2005 | Parker et al. |
| 2006/0004595 A1 * | 1/2006 | Rowland et al. ................... 705/1 |
| 2006/0020519 A1 | 1/2006 | Schroeder et al. |
| 2006/0129481 A1 | 6/2006 | Bhatt et al. |
| 2006/0195361 A1 | 8/2006 | Rosenberg |
| 2006/0270421 A1 | 11/2006 | Phillips et al. |
| 2007/0112667 A1 | 5/2007 | Rucker |
| 2007/0265995 A1 | 11/2007 | Remington et al. |
| 2008/0235174 A1 | 9/2008 | Scriffignano et al. |
| 2008/0249902 A1 | 10/2008 | Lehman et al. |
| 2010/0010968 A1 * | 1/2010 | Redlich et al. ................... 707/3 |
| 2010/0076968 A1 | 3/2010 | Boyns et al. |
| 2010/0079336 A1 | 4/2010 | Skibiski et al. |
| 2010/0318451 A1 * | 12/2010 | Niccolini et al. ............... 705/35 |
| 2010/0325035 A1 | 12/2010 | Hilgers et al. |
| 2010/0332583 A1 * | 12/2010 | Szabo ........................ 709/202 |
| 2011/0055173 A1 | 3/2011 | Stoker et al. |
| 2011/0087573 A1 | 4/2011 | Bahnck et al. |
| 2011/0247069 A1 * | 10/2011 | Slater ............................. 726/22 |
| 2012/0016693 A1 * | 1/2012 | Haywood et al. ................. 705/4 |
| 2012/0239699 A1 * | 9/2012 | Anand et al. ................. 707/792 |
| 2012/0246092 A1 | 9/2012 | Stibel et al. |
| 2012/0254056 A1 | 10/2012 | Max et al. |
| 2013/0013489 A1 * | 1/2013 | Kremen et al. ................. 705/38 |
| 2013/0097664 A1 * | 4/2013 | Herz et al. ........................ 726/1 |
| 2013/0097709 A1 * | 4/2013 | Basavapatna et al. .......... 726/25 |
| 2013/0117287 A1 * | 5/2013 | Jagota et al. ................. 707/755 |
| 2013/0191326 A1 * | 7/2013 | Sharma ........................ 707/608 |

* cited by examiner

CUSTOM SCORE GENERATION SYSTEM AND METHODS

CLAIM OF BENEFIT TO RELATED APPLICATIONS

This application claims the benefit of U.S. provisional application 61/785,238 entitled "Custom Score Generation Systems and Methods", filed Mar. 14, 2013. The contents of application 61/785,238 are hereby incorporated by reference.

TECHNICAL FIELD

The present invention pertains to the quantification of different data combinations into scores having diverse informational applications.

BACKGROUND

Decisions are principled on data. The more data that is available to an entity, the better that entity (whether an individual or a business) is equipped to make a decision in order to achieve a desired outcome. Data is therefore a foundational instrument guiding personal and business dealings.

Entities look to credit reports, professional and individual reviews, social media, accreditations, and the like to facilitate decision making. One normally does not exclusively rely on the data from a single data source as that data is ordinarily relevant to a single dimension of interest. To acquire a comprehensive and holistic account, one considers data from multiple data sources. Yet, piecing together the data from the different data sources and extracting the relevant components can become overly time consuming.

For these reasons, many of the data sources provide a score to quantify and summarize the data they present. From the score, one quickly collects the gist of the data underlying the score. If more information is needed, one can then inspect the actual data used in deriving the score. However, the scores do not detract from the fundamental issue that each score is dimensional and not holistic or comprehensive. Each score is limited to the underlying data that the data source generating the score has compiled on its own. For instance, a credit score is restricted to financial risk assessment without providing insight as to the credibility, quality, and timeliness of an entity. Similarly, reviews from yelp.com are restricted to experiences that others share about an entity without providing insight as to the financial stability or historical performance of the entity.

To overcome these issues, data sources are continually seeking new data to integrate. However, data collection is a difficult task. Privacy issues limit what can be collected and entities do not freely offer data about themselves. Even when data is collected, the data should be periodically updated in order to maintain its relevancy and should be verified to ensure that the data has not been falsified or provided under false pretenses.

Some data sources strike partnerships to gain access to the data of other data sources. This involves identifying a data source that has the desired data and that is willing to share that data. Once a willing partner is found, complex negotiations ensue to set the terms and conditions for how and what data is shared. With an agreement in place, the parties can configure their interfaces, protocols, and systems to interoperate. The final hurdle involves how to meaningfully integrate and use the newly accessible partner data. Scores are generated according to complex algorithms that account for different data elements as well as the weights and values that are attributed to those data elements. In order to integrate new data, these algorithms need to be modified.

Based on the provided background, it should be evident that because of the lack of freely available data and because of the difficulty in obtaining relevant data, there is a high barrier to entry for any entity that wants to offer or utilize data as part of a service. There is also a barrier to growth for existing entities offering or utilizing data as a service since part of their growth depends on how much new data they can collect in order to expand their existing services or offer new services.

There is therefore a need to simplify data sharing between two or more parties so as to facilitate introduction and expansion of services that offer or utilize data as part of the service. In conjunction therewith, there is a need to simplify score generation for scores that are generated based on the data of two or more entities.

SUMMARY OF THE INVENTION

It is an objective of the present invention to provide a system, methods, and machine implemented processes for custom score generation. It is an objective to enable new data services by offering third party data sources access to new data that they can merge with their own compiled data for the purpose of defining and producing custom scores based on the merged data from at least two data sources. To this end, it is an objective to simplify the custom score generation by providing various graphical interfaces for specifying the data that is to be merged and for specifying the values and weights defining the formulation of the custom score.

To achieve these and other objectives, some embodiments provide a custom score generation system. The system includes a shared database storing financial, organizational, historical, and other data elements for a vast set of entities.

The system registers a custom score framework for each custom score. In some embodiments, registering the custom score framework involves defining the custom score parameters including the value set and desired range for the custom score. This can also involve defining a distribution for the custom score.

To generate the custom score, the third party creating the custom score, selects various data elements from the system's shared database and from the third party's proprietary database. Each selected data element is attributed with a weight. The weight determines the impact that the data element has on the custom score. Also, a scoring rule or scoring parameters may be defined for each of the selected data elements. The scoring rule defines how values for a given data element are to be quantified. More specifically, the scoring rule evaluates a value for a given data element and maps that value to a component score that is used in deriving the custom score. The scoring parameters can serve as an alternative to the scoring rule. Rather than define the rule to quantify the data element values, the scoring parameters can include specifying maximum and minimum values or good and bad values for a data element and allowing the scoring system to quantify the actual values relative to the specified values. A conditional statement can also be provided for any of the selected data elements. The conditional statement is defined with a condition based on values of one of more data elements. The conditional statement is also defined with different weights, scoring rules, and/or scoring parameters to apply to the selected set of data elements according to which condition of the conditional statement is satisfied. The conditional can also be defined to include or exclude different sets of the selected data elements ion the custom score derivation according to which condition of the conditional statement is satisfied.

Using the custom score parameters, selected data elements, specified weights, scoring rules or parameters, and any conditions, the system formulates an algorithm to produce the custom score. The algorithm is stored as part of the custom score framework. When a score for a particular entity is to be computed, the data values for the selected data elements of the particular entity are input into the algorithm and a resulting score is output.

A primary utility of the custom score generation system stems from the simplified and computer automated manner with which the custom scores are generated. The system provides one or more interfaces from which a third party can select data elements from the shared database. The system also provides one or more interfaces to merge various data elements from the third party's database with the selected data elements from the shared database, specify the weights, any conditions, and any scoring rules or scoring parameters. Next, the system automatically formulates the algorithm on behalf of the third party to score the selected set of data elements according to the specified parameters (e.g., set of values, range, distribution, etc.), weights, rules, and conditions. In other words, the third party specifies the framework for the custom score and the system automatically generates the custom score according to the framework.

In some embodiments, the system generates the custom scores dynamically as they are requested. In such instances, the system provides a URL or other query string to the third party creating the custom score. The URL or query string identifies the framework for a desired custom score. It also accepts a parameter to identify an entity for which a score is to be computed. The third party then submits to the custom score generation system, the URL or query string parameter with an identifier for the entity. In return, the system retrieves the framework for the identified custom score as well as the data values of the identified entity for the selected data elements of the identified custom score. The entity's data values are partly retrieved from the system shared database based on those data elements that were selected from the system shared database and partly retrieved from the third party's proprietary database based on those data elements that were selected from the third party's proprietary database. The retrieved data values are fed into the custom score algorithm and a score is output. The output is then passed to the third party.

In some embodiments, the system precomputes the scores for a list of entities specified by the third party. The precomputed scores can be stored by either the system or the third party. Periodically, the scores are updated as entity values for the selected data elements are updated.

BRIEF DESCRIPTION OF THE DRAWINGS

In order to achieve a better understanding of the nature of the present invention a preferred embodiment of the custom score generation system will now be described, by way of example only, with reference to the accompanying drawings in which.

DETAILED DESCRIPTION OF THE INVENTION

In the following detailed description, numerous details, examples, and embodiments of a custom score generation system are set forth and described. As one skilled in the art would understand in light of the present description, the custom score generation system is not limited to the embodiments set forth, and may be practiced without some of the specific details and examples discussed. Also, reference is made to the accompanying figures, which illustrate specific embodiments in which the system can be practiced. It is to be understood that other embodiments can be used and structural changes can be made without departing from the scope of the embodiments herein described.

The custom score generation system expands the data services that any third party data source can offer. The system allows any such third party access to a shared database with the shared database offering data that is not present within the third party's own proprietary database. Data elements from shared database can then be merged with data elements from the third party's proprietary data for the purposes of creating new data-based services, wherein a data element refers to an instance of data. A primary data-based service envisioned is the creation of new custom scores that are derived based on data elements merged from the system shared database and the third party's proprietary database. In other words, the custom score generation system allows any third party to expand its data-based service offerings beyond those which could be derived solely from the third party's own compiled data elements or proprietary database.

Moreover, the system extends beyond simple data sharing by seamlessly completing the data merge and producing the custom scores on behalf of the third parties. Specifically, the third party can access the custom score generation system and through one or more interfaces define a custom score by selected the data elements that it lacks and wishes to merge with one or more of its own compiled data elements. The interfaces also simplify the means by which the third party specifies weights to attribute to the selected data elements, rules or parameters for scoring values of the selected data elements, and any conditions. The system automatically formulates the algorithm for producing the desired custom score from the selected data elements and the third party specifications without further action by the third party.

Figure 1:
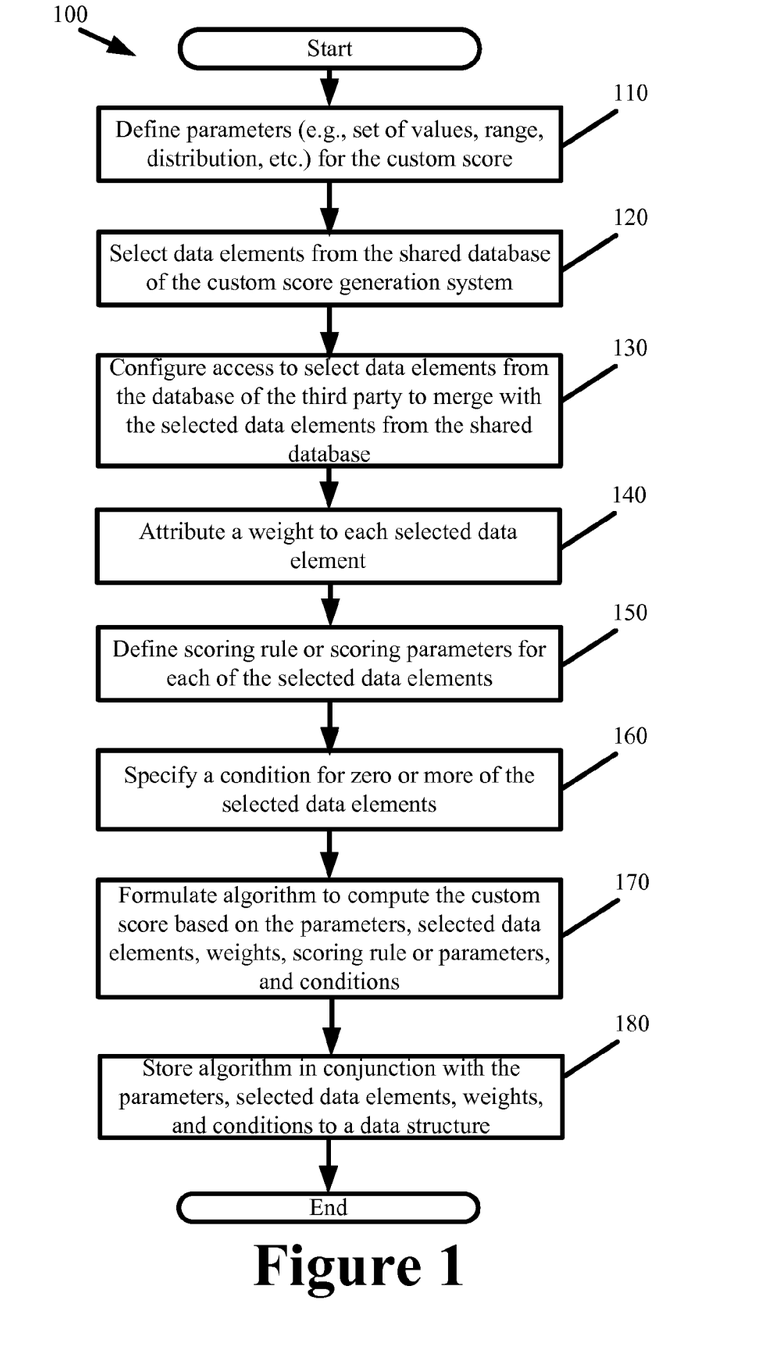
FIG. 1 presents a process for defining a custom score in accordance with some embodiments.

FIG. 1 presents a process 100 for defining a custom score in accordance with some embodiments. To define the custom score, the process 100 first defines (at 110) the parameters for the custom score. The parameters include the set of values, range, and distribution for the custom score. The set of values can be numeric, alphanumeric, or symbolic with the range specifying a minimum value and a maximum value for the defined set of values. The distribution specifies how produced scores map across the range. Some embodiments provide defaults for each parameter. The third party can modify the defaults as desired.

The process further involves selecting (at 120) data elements from the shared database of the custom score generation system. The process also involves configuring (at 130) access to select data elements from the database of the third party to merge with the selected data elements from the shared database.

Next, the process attributes (at 140) a weight to each selected data element. The weight determines the impact that each selected data element has on the custom score being generated.

The process may also involve defining (at 150) a scoring rule or scoring parameters for each of the selected data elements. The scoring rule or scoring parameters provide quantification for the values of a selected data element. In other words, the scoring rule or scoring parameters enable the custom score generation system to evaluate the significance of each value within the value range of the selected data elements, thereby enabling the custom score generation system to determine whether a particular value for a selected data element should increase or decrease the custom score being derived in part from that selected data element. In some embodiments, the scoring rule outputs a component score for a given value of a data element and the component score is incorporated as part of the custom score derivation.

A condition may be specified (at 160) for zero or more of the selected data elements. When a condition is specified for one or more of the selected data elements, different weights, scoring rules, or scoring parameters can be attributed to the other selected data elements according to how the condition is satisfied based on values for the one or more data elements specifying the condition. The condition can also be used to include or exclude different sets of the selected data elements according to how the condition is satisfied.

From the parameters, selected data elements, weights, scoring rules or parameters, and conditions, the process automatically formulates (at 170) an algorithm to compute the custom score. The process then stores (at 180) the algorithm in conjunction with the parameters, selected data elements, weights, and conditions to a data structure referred to herein as the custom score framework.

FIG. 1 presents a process for defining an entirely new custom score. However, the process can be adapted to allow for new custom scores to be defined by modifying existing scores of the third parties using data elements from the system shared database. In other words, the custom scores can be derivatives of existing third party scores. In some such embodiments, the custom score generation system retrieves an existing score that the third party has computed for the entity. The system then retrieves values that are specified for the third party within various selected data elements from the shared database. Those values are quantified according to specified weights, scoring rules or parameters, and any specified conditions. The retrieved score is then adjusted by the quantified values and a new score is output, wherein the new score is based on the existing score albeit modified to consider additional data elements from the shared database that are unavailable from the third party's proprietary database.

Figure 2:
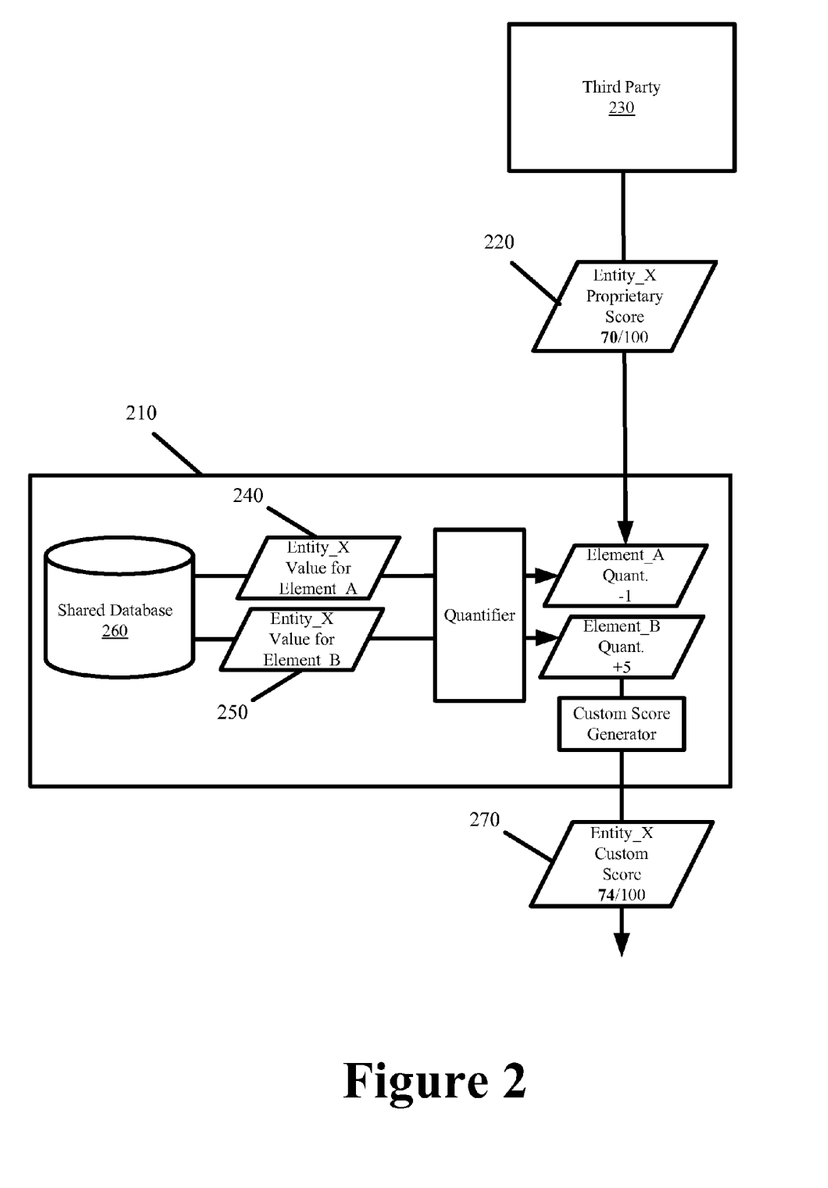
FIG. 2 conceptually illustrates producing a custom score from an existing third party score in accordance with some embodiments.

FIG. 2 conceptually illustrates producing a custom score from an existing third party score in accordance with some embodiments. As shown in FIG. 2, the custom score generation system 210 retrieves a proprietary score 220 that was produced by the third party 230 for a particular entity. The system 210 then retrieves values specified for the particular entity within data elements 240 and 250 of the shared database 260. The retrieved values are quantified according to the custom score definition. The resulting quantifications are then applied to the proprietary score 220 to produce the new custom score 270 for the particular entity.

Figure 3:
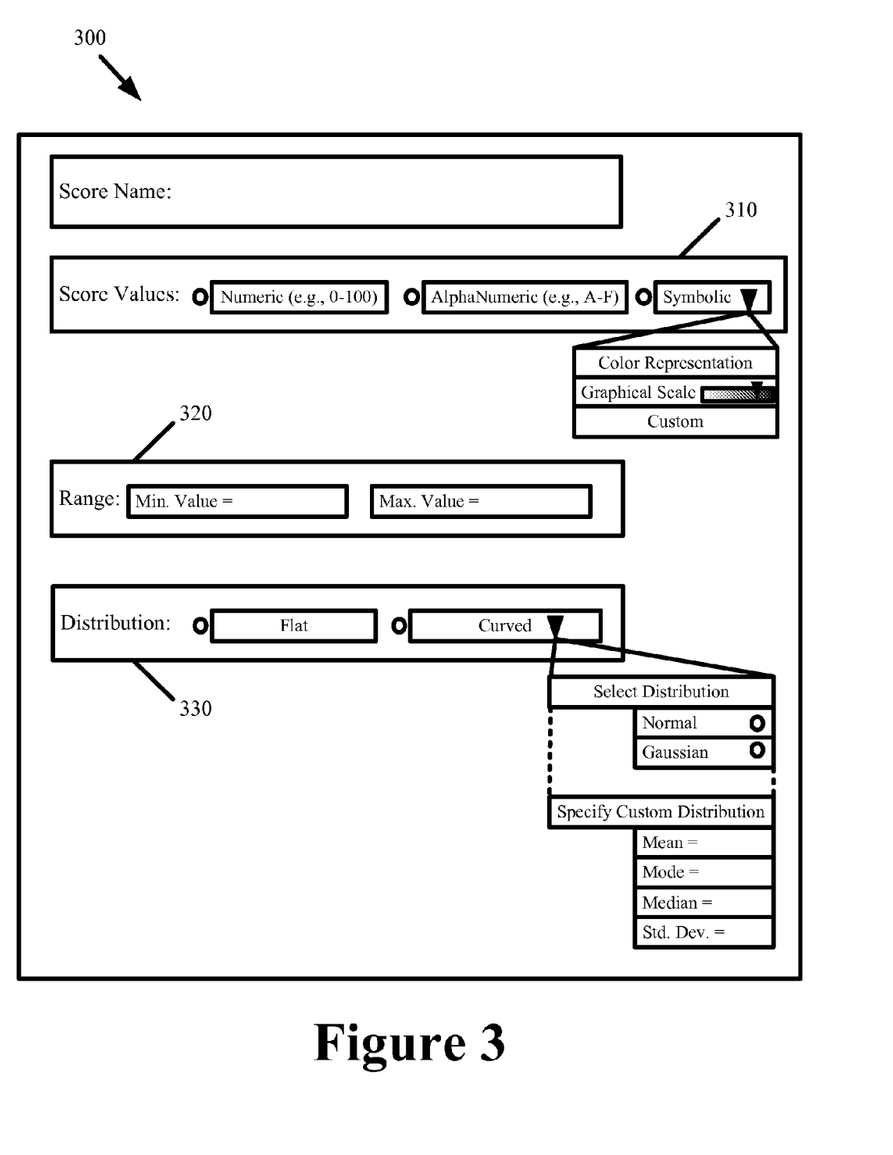
FIG. 3 presents an exemplary interface for registering a custom score framework in accordance with some embodiments.

FIG. 3 presents an exemplary interface 300 for registering a custom score framework in accordance with some embodiments. The interface 300 includes various input fields 310, 320, and 330.

The input field 310 defines the set of values for the custom score. The set of values can be numeric, alphanumeric, or symbolic. For instance, numeric values for the score can include 1, 2, 3, etc., alphanumeric values for the score can include A, B, C, D, and F, and symbolic values can include the colors green, yellow, and red as some examples. Drop down boxes can be provided within the input field 310 to present different predefined value sets. Some embodiments allow the third party to upload or specify their own set of values.

The input field 320 defines the range for the set of values. More specifically, the input field 320 defines the minimum value and maximum value for the selected value set, thereby imposing limits on the score. Additionally, the input field 320 can be used to define the value increments between the minimum value and the maximum value.

The input field 330 defines the distribution for the custom score. The distribution can be used to specify the average value and the percentage of scores that should fall within different values of the defined range. The distribution can be specified as a flat distribution or one that is varied (e.g., bell curve distribution). In some embodiments, the input field 330 is a free form field in which the third party can specify its own distribution for the scores. In some such embodiments, input field 330 accepts formulas defining the desired distribution or the input field 330 provides a set of predefined formulas that the third party can select and manipulate if desired.

Additional input fields (not shown) can be provided for the third party to further identify and define parameters for the score. A custom score framework is created to store the score parameters. The custom score framework is a data structure that is stored within a database of the custom score generation system.

Figure 4:
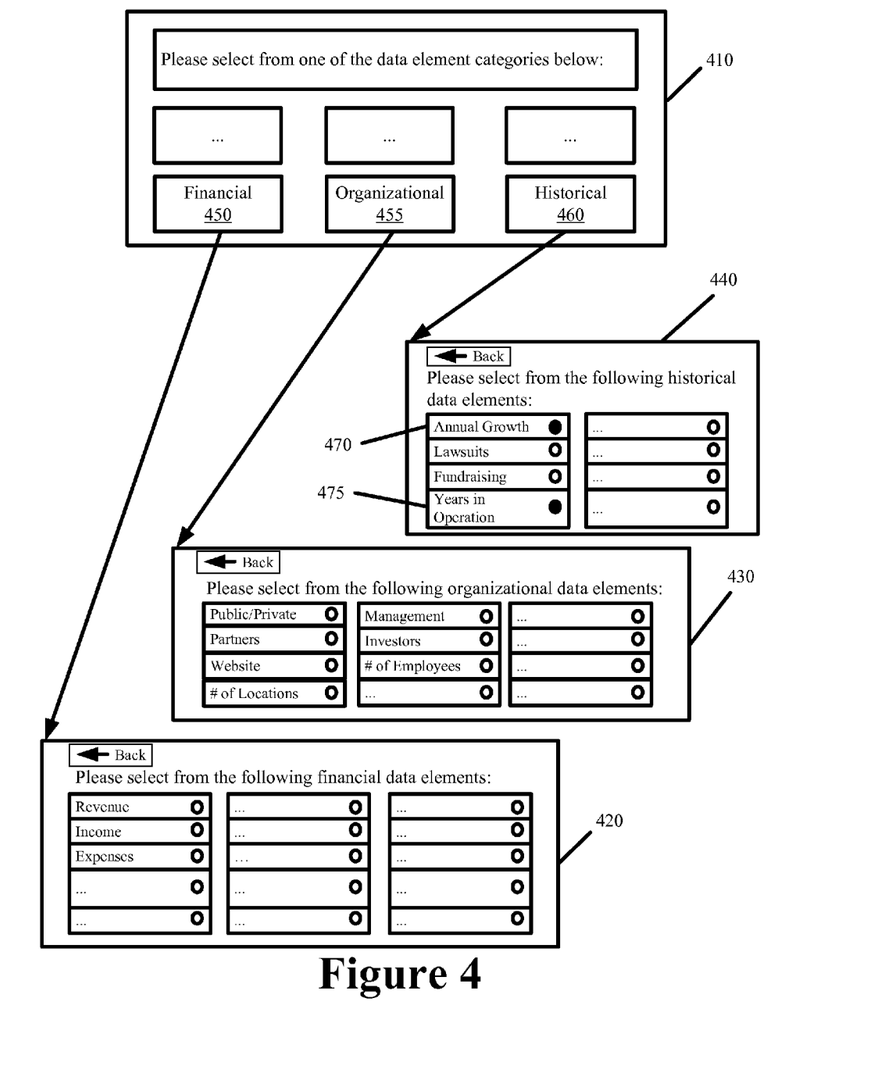
FIG. 4 presents a set of exemplary interfaces for selecting data elements from the system's shared database that are to be merged with data elements that are selected from the third party's proprietary database.

FIG. 4 presents a set of exemplary interfaces for selecting data elements from the system's shared database that are to be merged with the data source's proprietary data element. The figure illustrates a top-level first interface 410 and a second interface 420, third interface 430, and fourth interface 440 that are accessible from the top-level first interface 410.

Since the shared database offers access to a large number of selectable data elements, the first interface 410 is provided to organize the presentation of the selectable data elements. Specifically, the first interface 410 provides graphical elements for accessing different categories of selectable data elements. For example, the figure depicts graphical element 450 for accessing the selectable financial data elements, graphical element 455 for accessing the selectable organizational data elements, and graphical element 460 for accessing the selectable historical data elements. The figure provides an exemplary listing for some of the categories. Some embodiments may include additional data element categories in addition to or instead of those depicted in FIG. 4.

Each of the graphical elements (e.g., 450, 455, and 460) from the first interface 410 provides drill-down access to the underlying data elements when selected. For instance, selection of the graphical element 450 causes the second interface 420 to display from which the third party can select various financial data elements to include as part of the custom score deviation; selection of the graphical element 455 causes the third interface 430 to display from which the third party can select various organizational data elements to include as part of the custom score derivation; and selection of the graphical element 460 causes the fourth interface 440 to display from which the third party can select various historical data elements to include as part of the custom score derivation. One simply selects a radio button or other graphical selection tool displayed adjacent to a data element to include that data element as part of the custom score derivation. For instance, data elements 470 and 475 have been selected in the fourth interface 440. It should be apparent that other graphical means may be used to select the data elements.

FIG. 4 illustrates a two-tier hierarchy for the selecting the data elements from the shared database. However, other embodiments can organize the data elements in a single tier or under three of or more navigable tiers. Regardless, the graphical presentation illustrates the data elements that are available to the third party and provides an efficient means with which to select the desired data elements. As such, these interfaces facilitate a seamless merge of the shared database data elements with the proprietary data elements of the third party database. The data elements selected from the shared database are entered into the corresponding custom score framework for the custom score that is being defined.

Figure 5:
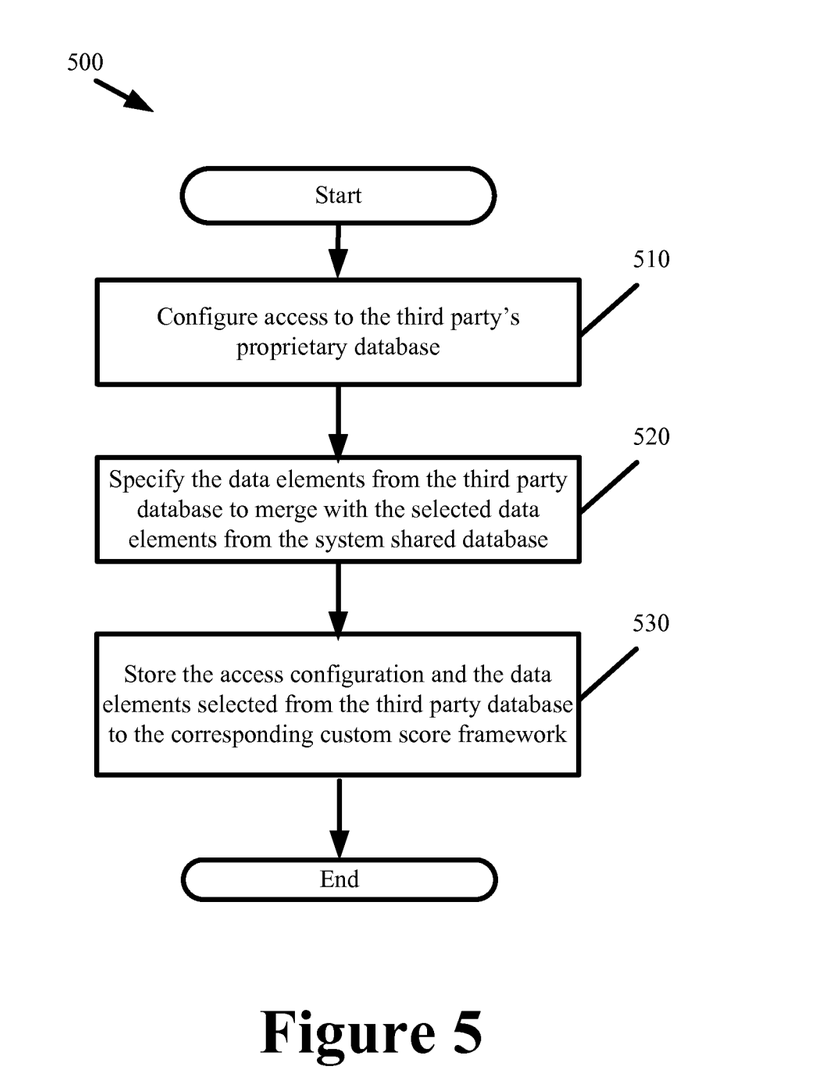
FIG. 5 provides a process to execute the merge of the data elements from the third party's proprietary database with the data elements that were selected from the shared database in accordance with some embodiments.

FIG. 5 provides a process 500 to execute the merge of the data elements from the third party's proprietary database with the data elements that were selected from the shared database in accordance with some embodiments. The process 500 involves configuring (at 510) access to the third party's proprietary database. Access may be configured differently based on different third party database deployments. In some embodiments, access may be configured by specifying the IP address and login credentials (e.g., username and password) to the third party database. In some embodiments, access may be configured by creating a script that establishes a network connection to the third party database and that navigates various security interfaces in order to gain access to the stored data elements.

Once access is configured, the process next specifies (at 520) the data elements from the third party database that are to be merged with the selected data elements from the system shared database. In some embodiments, the third party data source provides a listing of the specified data elements. The listing may identify keys or fields from the third party database. The listing may alternatively be provided as one or more queries. The queries link or otherwise retrieve the specified data elements. The queries may also accept at least one parameter to specify an entity. With the parameter, the queries can be used to extract data values for the identified entity from the specified data elements of the third party database. Alternatively, some embodiments scan the third party database once the access is successfully configured in order to identify the selectable data elements. The ability to scan the proprietary database may be restricted upon the formatting and structure of the third party database. For example, relational databases are well-defined and may be discoverable by the custom score generation system. Once the proprietary database is scanned, interfaces similar to the those depicted in FIG. 4 may be presented to allow the third party to graphically select the data elements that it wants to merge from the third party proprietary database with the data elements that were selected from the shared database. The process stores (at 530) the access configuration and the data elements selected from the third party database to the corresponding custom score framework.

Figure 6:
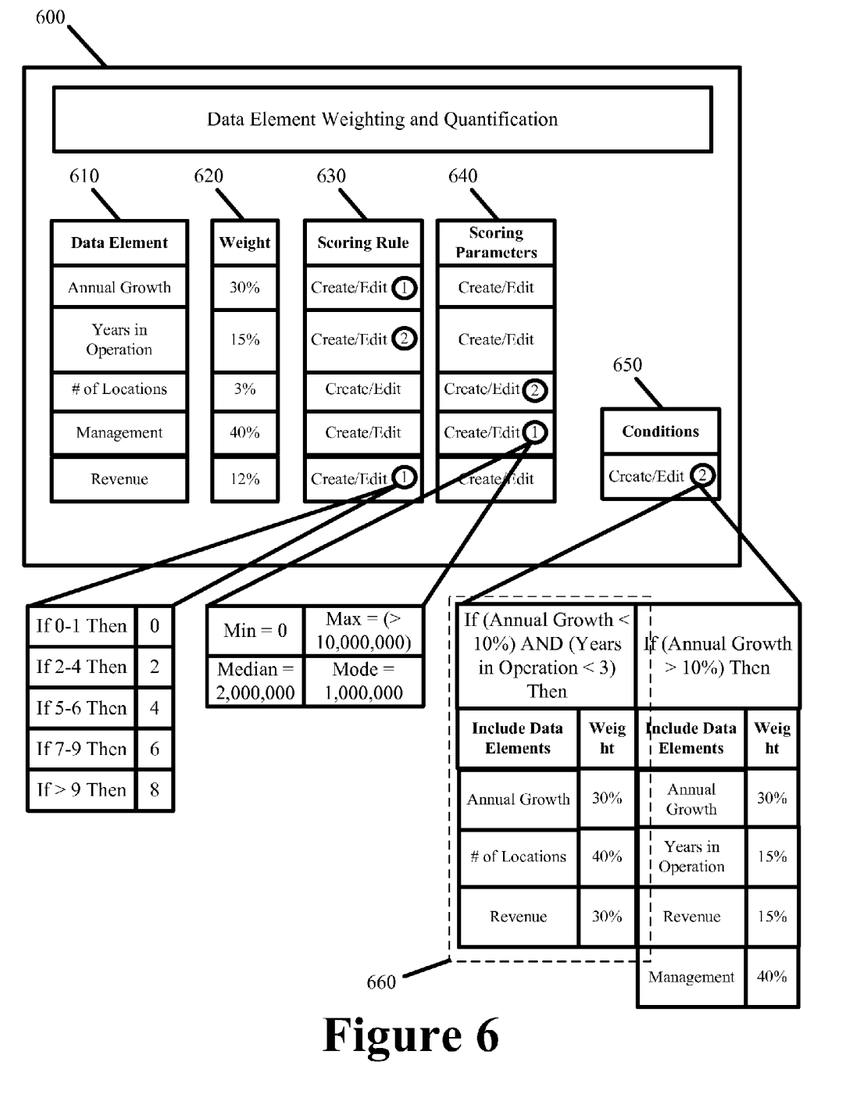
FIG. 6 presents an exemplary interface for attributing weights to the data elements that are selected from the shared database and the third party proprietary database as well as specifying a scoring rule or scoring parameters and conditions to the data elements.

FIG. 6 presents an exemplary interface 600 for attributing weights to the data elements that are selected from the shared database and the third party proprietary database as well as specifying a scoring rule or scoring parameters and conditions to the data elements. Accordingly, the interface 600 allows the third party to customize how each of the selected data elements affects the overall derivation of the custom score.

The interface 600 includes a first column 610 that presents each of the data elements that have been selected from the shared database as well as those that were merged from the third party's own proprietary database.

Adjacent to each presented data element is an input field 620. The input field 620 is used for attributing a weight to the data element. In some embodiments, the weight is specified as a percentage. Accordingly, the sum of all weights attributed to the selected data elements should equal 100. In some embodiments, the weight is specified as a value that is bounded in a specified range. For example, integer values between 0-10 can be attributed as the weight to each data element with the value of 0 representative of the lowest weighting and the value of 10 representative of the greatest weighting.

The weights specify what proportion of the custom score is determined from a data element, but not how the data element itself is quantified. In some cases, the values specified for each selected data element have no quantifiable significance. Another issue is that third parties may quantify the same data element value differently depending on the custom score being derived. For example, a first custom score may score an entity operating for 2 years higher than an entity operating for 10 years and a second custom score may score the entity operating for 10 years higher than the entity operating for 2 years. Accordingly, a scoring rule is defined to specify how the data element values should be quantified. To this end, the interface 600 provides, for each selected data element, a first button 630 for creating a scoring rule and a second button 640 for specifying scoring parameters.

When the first button 630 is invoked for a particular data element, a new interface is presented by which the invoking third party specifies a set of conditions for values of the particular data element. The conditions can be specified as "If X Then Y" clauses, wherein "X" specifies the one or more values or a range of values that satisfy the condition and "Y" provides the quantification for the values satisfying the condition. For example, the third party can select the data element that enumerates the number of years a business has been in operation. The scoring rule for this selected data element may then include a first condition that outputs a value of "C" for an entity operating less than 3 years, a second condition that outputs a value of "B" for an entity operating between 3 and 5 years, and a third condition that outputs a value of "A" for an entity operating more than 5 years. The set of conditions can also be used to specify a mapping, whereby values of the data elements are converted from one range of values to another range of values. For example, revenues between $0-$10,000 are mapped to values 0-10, revenues between $10,0001-$100,000 are mapped to values 11-100, and revenues between $100,001-$1,000,000 are mapped to values 101-1000.

When the second button 640 is invoked for a particular data element, a new interface is presented by which scoring parameters are provided. The scoring parameters serve as an alternative to the scoring rule. Rather than define the rule to quantify the values for a particular data element, the scoring parameters can include specifying a maximum value and a minimum value or one or more good values and one or more bad values for a data element such that the scoring system can then quantify the actual values relative to those specified values. Other scoring parameters including a mean, median, mode, and standard deviation may be provided in addition to or instead of the parameters specified above in order to better enable the custom score generation system to evaluate the significance of the value set for any data element.

For some data elements, the creation of the scoring rule or specification of the scoring parameters may be optional. In such cases, the system quantifies the values for the data elements based on a range of actual values that are obtained for different entities from the shared database or the third party proprietary database. For example, the third party may select a data element for the number of lawsuits an entity has been involved in. By scouring the system database records, the system identifies that a majority of entities have been involved in zero or a low number of lawsuits such that a high quantified value should be provided for a particular entity when that entity is involved in zero or low number of lawsuits and a low quantified value should be provided for the particular entity when that entity is involved in a high number of lawsuits.

The interface 600 can also be used to define conditional statements based on one or more of the selected elements. As noted above, the conditional statement can be used to attribute different weights, scoring rules, and/or scoring parameters to the selected data elements according to which condition of the conditional statement is satisfied. The conditional statements can also be used to include or exclude certain selected data elements in the custom score derivation according to which condition of the conditional statement is satisfied. The conditional statements can thereby be used to specify complex relationships between the data elements and, more specifically, a custom score whose derivation can vary depending on the values for one or more of the selected data elements.

Button 650 is provided in interface 600 to define one or more conditional statements. When the button 650 is invoked, a new conditional statement can be defined or an existing one can be edited. A new conditional statement is defined by identifying one or more of the selected data elements for the condition and specifying values for those data elements that would satisfy the condition. Then, the third party defines which data elements from the selected data elements are to be evaluated when the condition is satisfied as well as defining weights for the included data elements. In some embodiments, the system also allows for new scoring rules or scoring parameters to be defined for the data elements that are included as part of the defined condition.

660 illustrates one defined conditional statement in accordance with some embodiments. The condition for this conditional statement is defined using the "Annual Growth" data element and the "Years in Operation" data element. A value is the specified for each of the data elements to determine when the condition is satisfied. In this example, the condition is satisfied when a particular entity has an annual growth rate of greater than 10% and has been operating for less than 3 years. In this example, when the condition is satisfied, the data elements for "Annual Growth", "# of Locations", and Revenue" are included in the custom score derivation and a new set of weights are attributed to each of the included data elements.

Using the third party provided input (score parameters, selected elements, weights, scoring rules, conditional statements, etc.), the custom score generation system automatically formulates the algorithm that outputs the custom score as specified by the third party data source. Specifically, the formulation considers the score parameter inputs in order to produce an algorithm that outputs scores having a value in the specified set of values and the specified range. The algorithm variables include the data elements that were selected and merged from the shared database and the third party proprietary database. The values for the selected data elements are determined based on which entity is to be scored. The values for the selected data elements are computed according to the scoring rules or scoring parameters and are adjusted according to the specified weights and further according to the distribution specified by the third party data source. The algorithm is stored and associated with the custom score framework. In some embodiments, the algorithm is encoded as a set of computer instructions. This algorithm may be an executable script or application as some examples.

To make the algorithm invocable by the third party, some embodiments generate a URL or query string that can be used to remotely call a particular custom score algorithm. In some embodiments, the URL or query string accepts at least one parameter uniquely identifying the entity to be scored. The identifier can include one or more of the entity name, address, telephone number, social security number, DUNS® number, etc. For example, the URL "www.example.com/customscore12Xa3?entity=JohnSmith;555-555-5555" can be used to call the custom score algorithm identified by "customscore12Xa3" for the entity John Smith further identified by the telephone number 555-555-5555. The URL or query string is provided to the third party which can then obtain the custom score for any entity by simply specifying the parameter identifying the entity and issuing a request for the custom score to the custom score generation system using the URL.

Figure 7:
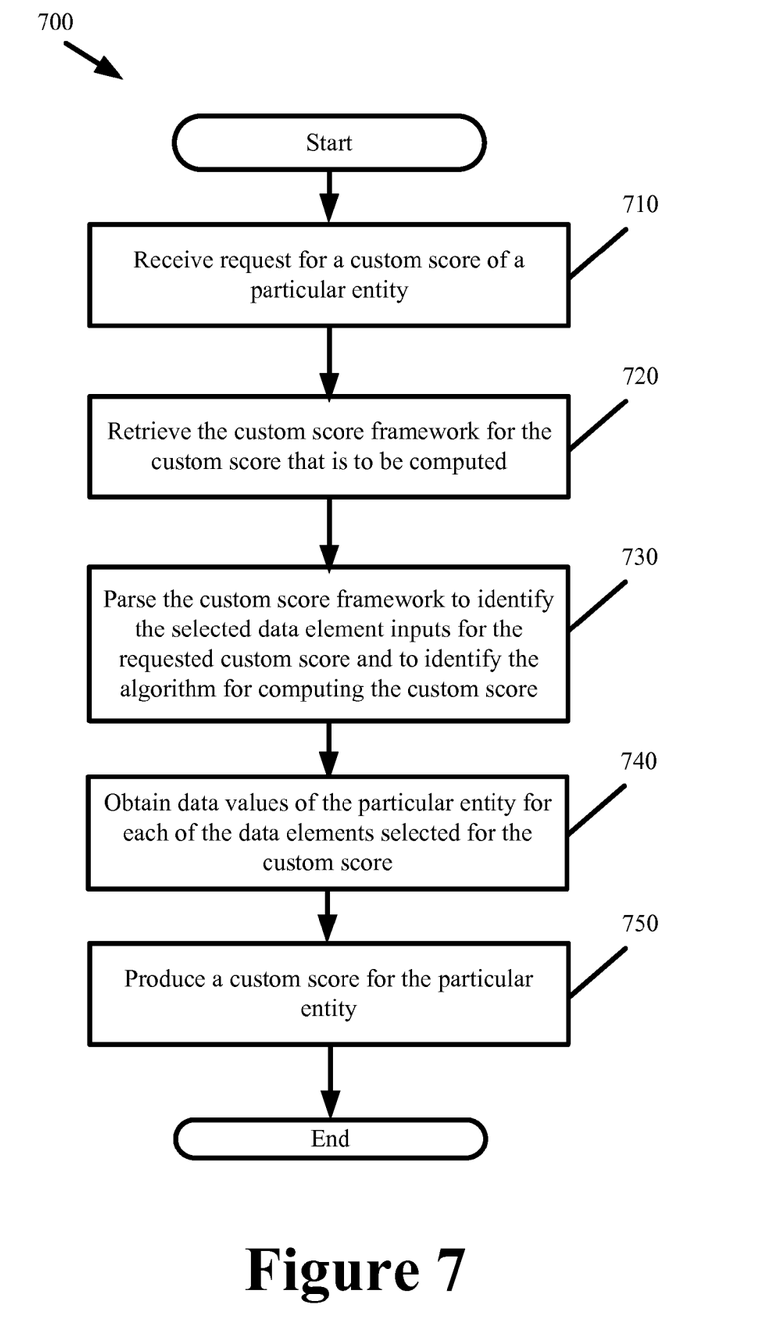
FIG. 7 presents a process for producing a custom score in accordance with some embodiments.

FIG. 7 presents a process 700 for producing a custom score in accordance with some embodiments. The process commences by receiving (at 710) a request for a custom score of a particular entity. The request will identify via the URL or query string the custom score to be computed. The request will also include a parameter to identify the particular entity for which the custom score is to be computed. As noted above, the identifier for the particular entity may be included as a parameter within the URL or query string.

Based on the request, the process retrieves (at 720) the custom score framework for the custom score that is to be computed. The process parses (at 730) the custom score framework to identify the selected data element inputs for the requested custom score and to identify the algorithm for computing the custom score based on data values that are provided for the data elements.

Then, using the particular entity identifier, the process obtains (at 740) data values of the particular entity for each of the data elements selected for the custom score. The process obtains the data values for the selected data elements from either the shared database of the custom score generation system or the proprietary database of the third party.

The obtained data values are provided as inputs to the identified algorithm in order to produce (at 750) a custom score for the particular entity. This includes determining whether the obtained data values satisfy any conditional statements specified for the custom score and computing the score according to the appropriate specified set of weights and scoring rules or parameters. The score can then be stored within the custom score generation system, stored within a database of the third party, or presented to the entity that submitted the request through either an interface of the custom score generation system or of the third party.

An example is now given to illustrate the advantages and opportunities afforded by the custom score generation system. In this example, the third party is a review aggregator. The review aggregator creates profiles identifying different entities (e.g., name, address, telephone number, website, etc.) and users can post reviews to those profiles in order to comment on their experiences with those entities. The aggregated reviews within a particular entity profile can be used to persuade one that is previously unfamiliar with that particular entity from engaging with that particular entity or engaging with a different entity offering a same good or service. To save a user from having to read each review in order to come to a decision, the review aggregator may provide a score that quantifies the sentiment from the reviews that are aggregated for the particular entity.

However, the review aggregator may wish to produce more granular or comprehensive scores, but is restricted from doing because of unavailable data. For example, rather than apply the same scoring algorithm to produce the review score for all entities, the review aggregator may wish to use different scoring algorithms to produce scores for entities operating in different industries. In other words, the review aggregator would like to produce different scores for lawyer, plumbers, doctors, restaurants, etc. The review aggregator would be unable to do so when it does not have the industry information for the reviewed entities.

The industry classification, however, can be one of several data elements available within the shared database of the custom score generation system. Accordingly, the review aggregator can use the custom score generation system to create a custom score framework to define a different custom score for lawyers, plumbers, doctors, and restaurants. The review aggregator selects the shared database data element for industry classification and various other data elements from the shared database and the review aggregator's proprietary database from which the custom score is derived. A conditional statement is specified based on the industry classification data element. Different data elements may then be included in the score computation based on the industry classification. Additionally, different weights and scoring rules or scoring parameters may be attributed to the sets of data elements that are included as part of the different industry classifications. For example, the custom score may be computed based on values for the data elements of sentiment, years in operation, and accreditations when the entity being scored is a doctor and the custom score may be computed based on values for the data elements of revenue, years in operation, and accreditations when the entity being scored is a lawyer.

In some embodiments, the custom score generation system is implemented by one or more network accessible servers having non-transitory computer-readable media and one or more processors. The non-transitory computer-readable media stores programs for the above described methods and processes. The one or more processors execute the programs to transform the servers to special purposed machines that facilitate custom score generation as described above. The system also produces tangible assets in the form of the custom scores. These scores can be sold as part of one or more data-based services of the third party.

Server, computer, and computer system are meant in their broadest sense, and can include any electronic device with a processor including cellular telephones, smartphones, portable digital assistants, tablet devices, laptops, and servers. Examples of non-transitory computer-readable media include, but are not limited to, CD-ROMs, flash drives, hard drives, EPROMs, etc.

Figure 8:
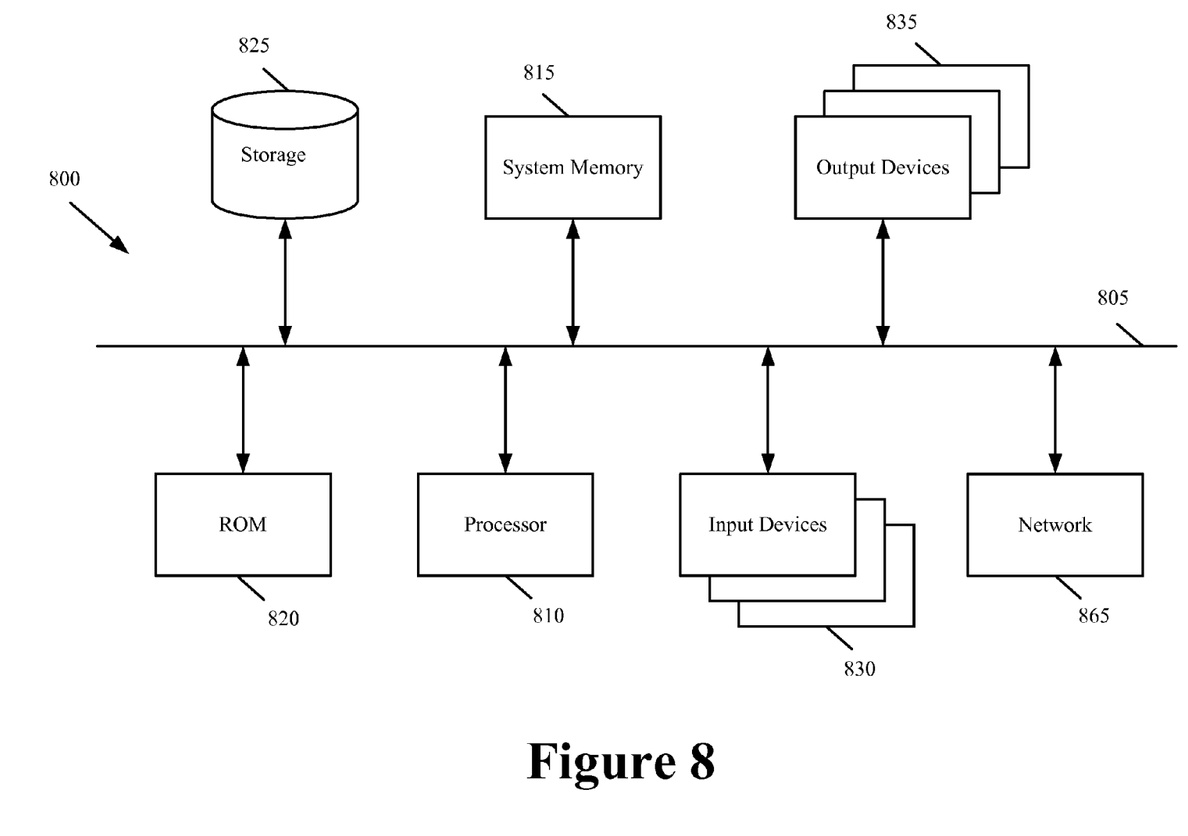
FIG. 8 illustrates a computer system with which some embodiments are implemented.

FIG. 8 illustrates a computer system or server with which some embodiments are implemented. Such a computer system includes various types of computer-readable mediums and interfaces for various other types of computer-readable mediums that implement the various processes, modules, and engines described above for the custom score generation system and its components. Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device. Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include any of a capacitive touchscreen, resistive touchscreen, any other touchscreen technology, a trackpad that is part of the computing system 800 or attached as a peripheral, a set of touch sensitive buttons or touch sensitive keys that are used to provide inputs to the computing system 800, or any other touch sensing hardware that detects multiple touches and that is coupled to the computing system 800 or is attached as a peripheral. The input device 830 also include alphanumeric keypads (including physical keyboards and touchscreen keyboards), pointing devices (also called "cursor control devices"). The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the internet. For example, the computer 800 may be coupled to a web server (network 865) so that a web browser executing on the computer 800 can interact with the web server as a user interacts with a GUI that operates in the web browser.

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. For a custom score generation system, a method for enabling a third party to offer data-based services that are not restricted to data elements within a third party database operated by the third party independent of a shared database operated by the custom score generation system, the method comprising:

providing at least one interactive display interface to the third party, the interactive display interface presenting a listing of data elements from the shared database that can be included as part of a custom score definition, wherein the data elements include data elements that are not present in the third party database;

receiving a first third party selection based on interactions that the third party has with the interactive display interface, the first third party selection identifying a first set of the data elements from the shared database to include as part of the custom score definition;

receiving a second third party selection based on input from the third party, the second third party selection identifying a second set of data elements from the third party database to further include as part of the custom score definition;

modifying the custom score definition by defining a score range, wherein defining the score range comprises setting a minimum score and a maximum score for a custom score of the custom score definition;

modifying the custom score definition by defining a score distribution, wherein defining the score distribution comprises setting a percentage of entities that will be assigned each score between the minimum and maximum scores;

configuring the custom score definition with a scoring rule, said scoring rule defining a correlation between values of the first set of data elements and the second set of data elements to different values of the custom score according to said score range and said score distribution; and outputting the custom score for a particular entity to the third party in response to a request from the third party for the particular entity's custom score, wherein outputting the custom score comprises retrieving values of the particular entity for each data element of the first set of data elements from the shared database and values of the particular entity for each data element of the second set of data elements from the third party database and evaluating said values according to the scoring rule.

2. The method of claim 1 further comprising providing the third party with a link to request the custom score for any entity, the link comprising a first identifier identifying the custom score from other scores defined using the system and a second identifier identifying a particular entity to score.

3. The method of claim 1 further comprising receiving from the interactive display interface, a weight that the third party attributes to at least one data element of the first and second sets of data elements, the weight defining an impact that each data element has on the custom score.

4. The method of claim 1 further comprising configuring the system with access to the third party database for retrieval of the second set of data elements.

5. The method of claim 1 further comprising defining a condition that includes a first subset of the first and second sets of data elements as part of the custom score definition when the condition is met and that includes a different second subset of the first and second sets of data elements as part of the custom score definition when the condition is not met.

6. The method of claim 5 further comprising computing and outputting the custom score using values for the first subset of the first and second sets of data elements when an entity being scored satisfies the condition and computing and outputting the custom score using values for the second subset of the first and second sets of data elements when the entity being scored does not satisfy the condition.

7. The method of claim 1 further comprising defining a condition that attributes a first set of weights to the first and second sets of data elements when the condition is met and that attributes a second set of weights to the first and second sets of data elements when the condition is not met.

8. A method performed by a custom score generation system enabling a third party accessing the custom score generation system to offer a data-based service that is not restricted to available data elements from a database of the third party, the method comprising:

with a machine of the custom score generation system comprising a processor executing instructions for:

defining a custom score according to input from the third party, said input identifying (i) a first set of data elements from a first plurality of data elements that are available from the third party database and (ii) a second set of data elements that are not available from the third party database and that are obtained from a second plurality of data elements of a shared database of the custom score generation system;

generating a scoring rule by quantifying an impact that each data element value for each of the first and second sets of data elements has on the custom score, wherein quantifying the impact comprises (i) obtaining a distribution of actual data element values assigned to a plurality of entities for each data element of the first and second sets of data elements and (ii) computing from the distribution of each data element, an impact that each data element value in the distribution has on the custom score;

receiving at the custom score generation system, a Uniform Resource Locator (URL) from the third party, the URL comprising a first identifier identifying the custom score to be produced from other scores defined by the system and a second identifier identifying the particular entity for which the custom score is to be produced;

merging a first set of the particular entity's values for each data element of the first set of data elements from the third party database with a second set of the particular entity's values for each data element of the second set of data elements from the shared database of the custom score generation system by using the first identifier to identify the first and second sets of data elements and the second identifier to identify the particular entity's values for the first and second sets of data elements;

producing the custom score for the particular entity by quantifying the first set of values and the second set of values according to said scoring rule; and providing the custom score from the custom score generation system to the third party in response to said request.

9. The method of claim 8 further comprising providing the first and second sets of values as inputs to the scoring rule.

10. The method of claim 8, wherein merging the first set of the particular entity's values comprises accessing and retrieving the particular entity's values for each data element of the first set of data elements from the third party database.

11. The method of claim 8, wherein the third party is prevented from obtaining the second set of data elements from the shared database of the custom score generation system.

12. The method of claim 8 further comprising adjusting a weight for each quantified value based on weights attributed to each of the first and second sets of data elements.

13. A method enabling a data service provider accessing a custom score generation system to offer a data-based service that is not restricted to available data elements from a database of the data service provider, the method comprising:

with a machine of the custom score generation system comprising a processor executing instructions for:

providing an interactive interface with which a first data service provider defines a first custom score and a second data service provider defines a different second custom score, and wherein providing the interactive interface comprises presenting a plurality of drill-down layers, wherein the plurality of drill-down layers comprise a first drill-down layer populating the interactive interface with a set of financial data elements from a shared database of the custom score generation system, a second drill-down layer populating the interactive interface with a set of organizational data elements from the shared database, and a third drill-down layer populating the interactive interface with a set of historical data elements from the shared database, wherein any data element from the set of financial data elements, the set of organizational data elements, and the set of historical data elements can be selected for inclusion as part of a custom score definition using said interactive interface;

retrieving a first entity's values for a first set of data elements from a database of a first data service provider according to a definition of the first custom score specified by the first data service provider;

retrieving a second entity's values for a second set of data elements from a database of a second data service provider according to a definition of the second custom score specified by the second data service provider;

producing at the custom score generation system, (i) the first custom score by merging the first entity's values for the first set of data elements with the first entity's values for a first subset of the financial, organizational, and historical sets of data elements that the first data service provider selects from at least one of the first, second, and third drill-down layers using the interactive interface and (ii) the second custom score by merging the second entity's values for the second set of data elements with the second entity's values for a different second subset of the financial, organizational, and historical sets of data elements that the second data service provider selects from at least one of the first, second, and third drill-down layers using the interactive interface; and providing (i) the first custom score to the first data service provider and (ii) the second custom score to the second data service provider, wherein the first custom score becomes available as part of a data-based service offered by the first data service provider such that the first custom score is not available at the second data service provider, and wherein the second custom score becomes available as part of a data-based service offered by the second data service provider such that the second custom score is not available at the first data service provider.

14. The method of claim 13 further comprising obtaining from the first data service provider, a first value set and a first value range for the first custom score, and obtaining from the second data service provider, a second value set and a second value range for the second custom score, wherein the first value set and the first value range differ from the second value set and the second value range.

15. The method of claim 13 further comprising obtaining from the first data service provider, a first set of scoring rules to quantify values for the first subset of the financial, organizational, and historical sets of data elements and obtaining from the second data service provider, a second set of scoring rules to quantify values for the different second subset of the financial, organizational, and historical sets of data elements differently than the first set of scoring rules.

16. The method of claim 13 further comprising providing a first set of weights to each data element of the first subset of data elements as part of the first custom score definition and a second set of weights to each data element of the second subset of data elements as part of the second custom score definition.

* * * * *